(12) United States Patent
Key et al.

(10) Patent No.: US 11,119,545 B2
(45) Date of Patent: Sep. 14, 2021

(54) FILTER MESH WITH INCORPORATED STRAIN GAUGE

(71) Applicant: HEWLETT-PACKARD DEVELOPMENT COMPANY, L.P., Spring, TX (US)

(72) Inventors: Cameron Key, Fort Collins, CO (US); Peter Andrew Seiler, Fort Collins, CO (US); Thomas Aaron Bondurant, Fort Collins, CO (US); Paul Howard Mazurkiewicz, Fort Collins, CO (US); Raphael Gay, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 14 days.

(21) Appl. No.: 16/342,494

(22) PCT Filed: Oct. 17, 2016

(86) PCT No.: PCT/US2016/057365
§ 371 (c)(1),
(2) Date: Apr. 16, 2019

(87) PCT Pub. No.: WO2018/075002
PCT Pub. Date: Apr. 26, 2018

(65) Prior Publication Data
US 2019/0243432 A1    Aug. 8, 2019

(51) Int. Cl.
*G06F 1/20* (2006.01)
*B01D 46/00* (2006.01)
*B01D 46/42* (2006.01)

(52) U.S. Cl.
CPC ......... *G06F 1/206* (2013.01); *B01D 46/0086* (2013.01); *B01D 46/42* (2013.01);
(Continued)

(58) Field of Classification Search
CPC ....... G06F 1/206; G06F 1/20; B01D 46/0086; B01D 46/42; B01D 2279/45; G05B 23/0294
(Continued)

(56) References Cited

U.S. PATENT DOCUMENTS

| 5,205,156 | A | * | 4/1993 | Asano | ................ | B01D 46/0086 73/38 |
| 5,572,403 | A | | 11/1996 | Mills | | |
| 7,411,785 | B2 | | 8/2008 | Doll | | |
| 2005/0163461 | A1 | * | 7/2005 | Ziebart | ................ | G01G 3/1402 385/147 |

(Continued)

FOREIGN PATENT DOCUMENTS

| CN | 203623171 U | 6/2014 |
| DE | 202006006727 U1 | 8/2006 |

(Continued)

OTHER PUBLICATIONS

Bag House and Dust Collector Differential Pressure Sensor, <http://www.babbittinternational.com/bps400.html.

*Primary Examiner* — Rocio Del Mar Perez-Velez
*Assistant Examiner* — Alicia M. Choi
(74) *Attorney, Agent, or Firm* — Tong Rea Bentley & Kim (57) ABSTRACT

In example implementations, a computing system is provided. The computing system includes at least one electronic component, a fan and a filter. The electronic component generates heat that is cooled by an air flow within the computing system that is generated by the fan. The filter is located in a path of the air flow. The filter includes a filter mesh with a strain gauge that is encapsulated and incorporated into the filter mesh to measure an amount that the filter mesh is clogged.

13 Claims, 5 Drawing Sheets

(52) U.S. Cl.
 CPC ............ *G06F 1/20* (2013.01); *B01D 2279/45* (2013.01); *G05B 2219/37371* (2013.01)

(58) Field of Classification Search
 USPC ........................................................ 700/300
 See application file for complete search history.

(56) References Cited

U.S. PATENT DOCUMENTS

| | | | | |
|---|---|---|---|---|
| 2006/0254366 | A1* | 11/2006 | Williamson | G01L 1/22 73/786 |
| 2007/0081888 | A1* | 4/2007 | Harrison | F04D 29/666 415/47 |
| 2013/0055793 | A1* | 3/2013 | Karasuyama | B01D 46/448 73/37 |
| 2014/0208942 | A1* | 7/2014 | Scipio | B01D 46/0086 95/1 |
| 2014/0260596 | A1* | 9/2014 | Kubicek | G01P 13/02 73/170.16 |
| 2015/0369717 | A1* | 12/2015 | Twiss | G01N 15/08 73/38 |
| 2016/0243486 | A1* | 8/2016 | Galsim | F24F 13/28 |
| 2017/0038266 | A1* | 2/2017 | Syck | G01L 1/2287 |
| 2018/0135601 | A1* | 5/2018 | Caponetti | F03D 13/35 |
| 2019/0074245 | A1* | 3/2019 | Kasper | H05K 3/4611 |
| 2019/0291037 | A1* | 9/2019 | Arthur | G01L 19/086 |

FOREIGN PATENT DOCUMENTS

| | | |
|---|---|---|
| JP | 3075878 B2 | 8/2000 |
| RU | 125875 U1 | 3/2013 |

\* cited by examiner

FILTER MESH WITH INCORPORATED STRAIN GAUGE

BACKGROUND

In any system in which a fluid, gas or liquid is blown, drawn or pumped through, a filter can be used to remove particulates from the fluid flowing through the system. Particulates in the fluid can negatively affect the performance of the system. Thus, the use of the filter may prevent the particulates from entering the system.

As the filter collects more and more particulates, the filter can become clogged. As a result, the filter can inhibit the flow of the fluid, gas or liquid in the system. Thus, the filter is occasionally removed and cleaned or replaced.

DETAILED DESCRIPTION

The present disclosure discloses, inter alia, apparatuses for measuring an amount of clogging of a filter in a computer system and methods for calibrating the same. As discussed above, in any system in which a fluid, gas or liquid is blown, drawn or pumped through, a filter can be used to remove particulates from the fluid flowing through the system. Particulates in the fluid can negatively affect the performance of the system. Thus, the filters can be used to prevent the particulates from entering the system.

As the filter collects more and more particulates, the filter can become clogged. As a result, the filter can inhibit the flow of the fluid, gas or liquid in the system. Thus, the filter is occasionally removed and cleaned or replaced.

Strain gauges can be used to measure an amount of clogging of the filters. However, the strain gauges may be located away from the filter as part of a separate system. In addition, the strain gauges may be exposed. As a result, conductive particles can negatively affect the strain gauge and cause the strain gauge to give false positives.

In contrast, an example may include a design that prints the strain gauge inside the fibers of the filter mesh or onto the filter mesh with an encapsulation. As a result, the strain gauge is not affected by conductive particles.

In addition, most strain gauges used in large heating, ventilation and air conditioning (HVAC) systems provide only a binary output. In other words, the strain gauges may determine whether the filter is clogged or not clogged. In contrast, an example may include a design that allows the strain gauges to have a more granular measuring capability. For example, the strain gauges may provide a percentage associated with how much a filter is clogged.

Lastly, designs may calibrate the strain gauge under no load. In other words, the strain gauges are calibrated without the presence of any air flow. However, in computer systems, a fan is generally turned on to cool electronic components within the computer system during standard operation. Thus, if the strain gauge is calibrated under no load, the strain gauge may often provide false positives. An example may include a method to calibrate the strain gauge within the presence of an air flow generated by the fan.

Figure 1:
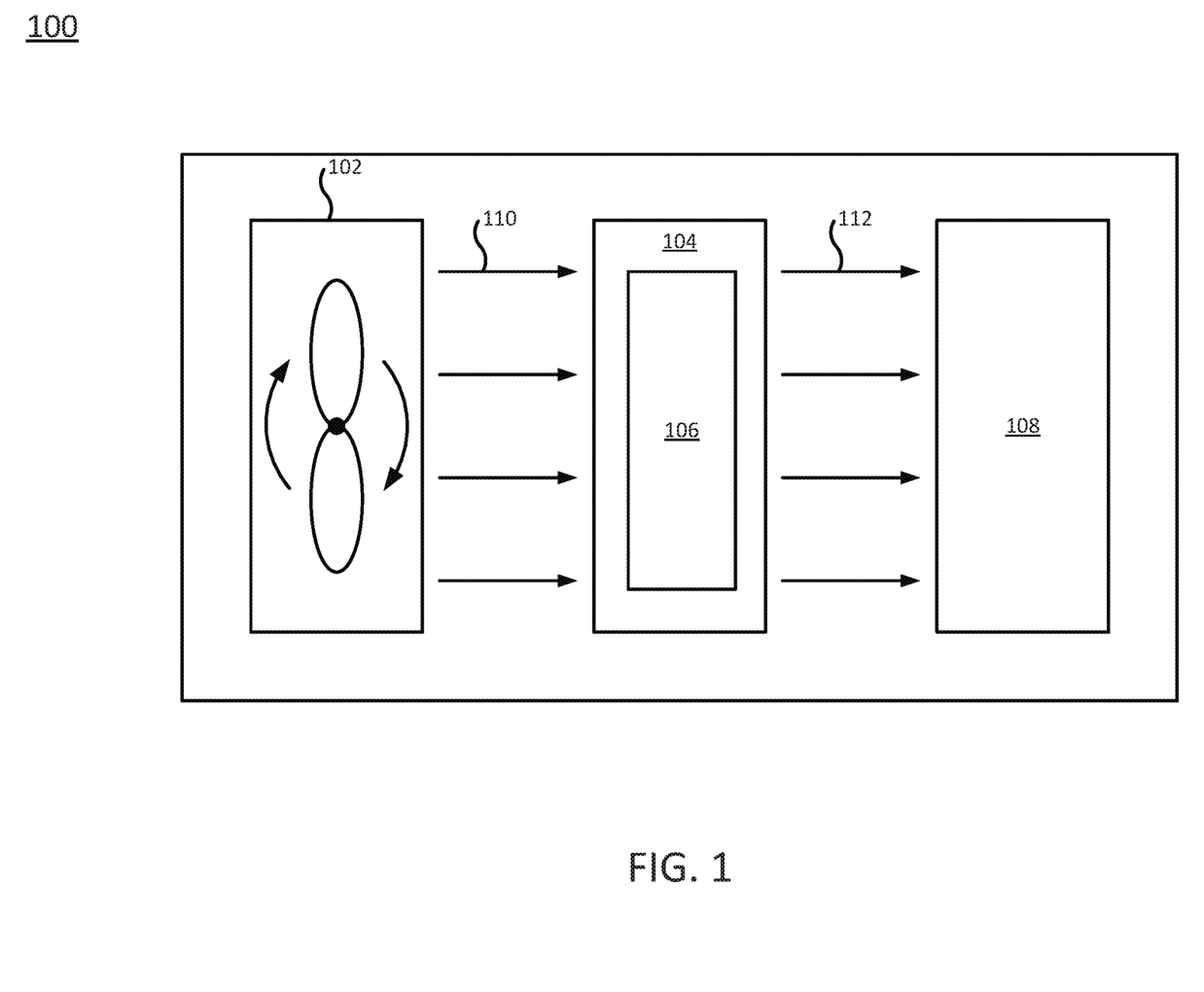
FIG. 1 is a block diagram of an example computing system of the present disclosure.

FIG. 1 illustrates a block diagram of an example computing system 100 of the present disclosure. The computing system 100 may include a fan 102, a filter 104 and at least one electronic component 108. In one example, the at least one electronic component 108 may be a processor, a memory, a network card, a graphics processor and so on. In one example, the at least one electronic component 108 may be any combination of the above. The electronic component 108 may generate heat during standard operation of the computing system 100.

In response, the computing system 100 may turn on the fan 102 to generate air flow 110 to cool the electronic component 108. The electronic component 108 may be located within a path of the air flow 112.

Over time, particles can accumulate within the computing system 100. These particles may negatively affect the electronic component 108. As a result, the filter 104 may be positioned within a path of the air flow 112 and between the fan 102 and the electronic component 108. For example, the filter 104 may be downstream or upstream of the fan 102 depending on a configuration of the fan 102 and the electronic component 108.

The filter 104 may remove, trap, collect, or filter contaminants or particles that may be in the air flow 110. As a result, filtered air flow 112 may pass through and over the electronic component 108 to cool the electronic component 108.

In one implementation, the filter 104 may include a filter mesh with a strain gauge 106 that is incorporated and encapsulated into the filter mesh to measure an amount that the filter mesh is clogged. The strain gauge 106 may comprise a thin conductive metal wire or trace.

In one example, the strain gauge 106 may be incorporated into the filter mesh by integrally forming the strain gauge 106 inside of the filter mesh. For example, the strain gauge 106 may be printed inside of the fibers of the filter mesh using a three dimensional printer with voxel level control. The conductive particles may be placed inside the fibers by the three dimensional printer when it is capable of printing with both conductive and non-conductive materials. Alternatively, the conductive traces may be embedded in the three dimensional printed mesh as a separate process where part of the filter mesh is printed, then conductive traces are applied, then the remainder of the non-conductive material is printed over the conductive traces using three dimensional printing. As a result, the conductive lines may be located within the fibers of the filter mesh and encapsulated by the fibers of the filter mesh.

In addition, the strain gauge 106 may be encapsulated by being printed inside of the fibers of the filter mesh. As a result, the strain gauge 106 may be protected from conductive particles that could negatively affect the performance of the strain gauge 106. For example, conductive particles can cause the strain gauge 106 to have false positive readings.

In another example, the strain gauge 106 may be incorporated into the filter mesh by printing the strain gauge 106 directly onto the filter mesh. The strain gauge 106 may then be encapsulated with a non-conductive coating, wax or epoxy to protect the conductive lines of the strain gauge 106 from conductive particles or other contaminants.

In another example, the strain gauge 106 may be a wire, or thread, that is weaved through, or stitched in a surface of the filter mesh. For example, a conductive wire of the strain gauge 106 may be interlaced with the fibers of the filter mesh so that they are intertwined. Said another way, the conductive wire may pass through the fibers of the filter mesh at right angles as done with a fabric that is woven.

Figure 2:
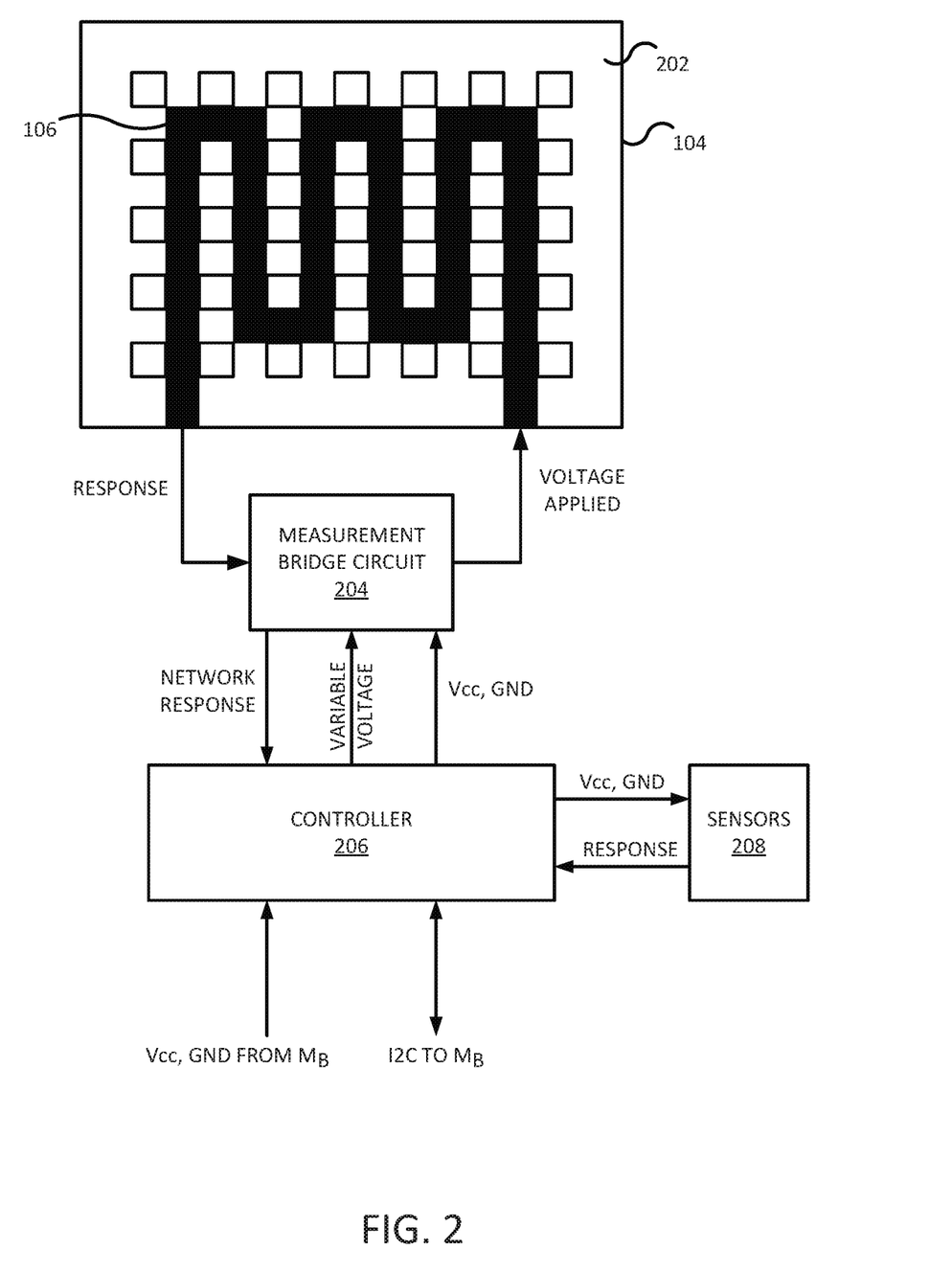
FIG. 2 is a block diagram of an example filter of the present disclosure.

FIG. 2 illustrates an example of the filter 104 of the present disclosure. In one example, the filter 104 may include a filter mesh 202 and the strain gauge 106. The strain gauge 106 may be formed in an example serpentine pattern inside of the filter mesh 202 or printed on top of the filter mesh 202 and encapsulated, as described above. In one example, the strain gauge 106 may be incorporated into the filter mesh 202 to cover 50% or more of the surface area of the filter mesh 202 being measured. The area used for sensing dust accumulation may be a representative of the entire systems filtration system, and so the sensor area may be a part of a larger filtration system. In one example, the sensor area may be chosen to represent the filtration area most susceptible to dust accumulation.

As a result, the strain gauge 106 of the present disclosure may provide more sensitivity and granularity in measuring an amount of clogging of the filter 104. For example, the fan 102 of the computing system 102 may generate approximately 15 cubic feet per minute (CFM) to 50 CFM of air flow. Standard strain gauges used in large HVAC systems typically generate approximately 700 CFM of air flow or greater. Thus, some strain gauges used in large HVAC systems may not be compatible for use in the computing system 100. For example, the strain gauges in the large HVAC systems may not be sensitive enough to detect clogging within much lower airflows that are generated by the fan 102 of the computing system 100.

In addition, the strain gauge 106 may provide an effective strain measurement that can be converted into a percentage level of clogging between 0-100%. For example, a calibration may be performed to obtain the effective strain measurement when the filter mesh 202 is unclogged. The effective strain measurement when the filter mesh 202 is clogged may be obtained from stored values of previous filter meshes 202 that were clogged or may be obtained by inserting a clogged filter mesh 202 during calibration to obtain the effective strain measurement of the clogged filter mesh 202. The value of the effective strain measurement may be converted into a percentage based on where the effective strain measurement falls between the effective strain measurements when the filter mesh 202 is unclogged and clogged. In contrast, the strain gauges used in large HVAC systems typically provide a binary output (e.g., the filter is clean or the filter is clogged).

In one example, a measurement bridge circuit 204 may apply a known voltage to the strain gauge 106. When the resistance of the strain gauge 106 changes due to collection of particles, or bending of the strain gauge 106 caused by collection of contaminants that block the air flow 110, the response voltage that is received by the measurement bridge circuit 204 may change. The measurement bridge circuit 204 may measure the effective strain on the strain gauge 106 based on the response voltage.

In one example, a controller 206 may be in communication with the measurement bridge circuit 204 and one or more sensors 208. In one example, the controller 206 may compare the effective strain that is measured and convert the effective strain to a percentage of clogging. In one example, the percentage may be based on, or calculated by, dividing an effective strain that is measured at a current time by a baseline effective strain that is measured at calibration time.

In one example, the controller 206 may adjust the effective strain calculation based on one or more measurements of the environment by the sensors 208, For example, changes in temperature and humidity level may change the response of the strain gauge 106. The controller 206 may account for the changes in temperature and humidity level in determining a final effective strain measurement.

In one example, the controller 206 may trigger an alarm if the effective strain is above a threshold. For example, it may be determined that the filter 104 should be replaced or cleaned if the filter 104 is clogged more than 50%. When the effective strain correlates to the filter 104 being clogged more than 50%, an alarm may be triggered. In some implementations, the alarm may be a message on a display of the computing system 100, lighting or flashing an LED indicator on the computing system 100, sounding an audible alarm from a speaker on the computing system 100, notifying a processor or basics input/output system (BIOS) that the filter 104 is clogged, and the like.

Figure 3:
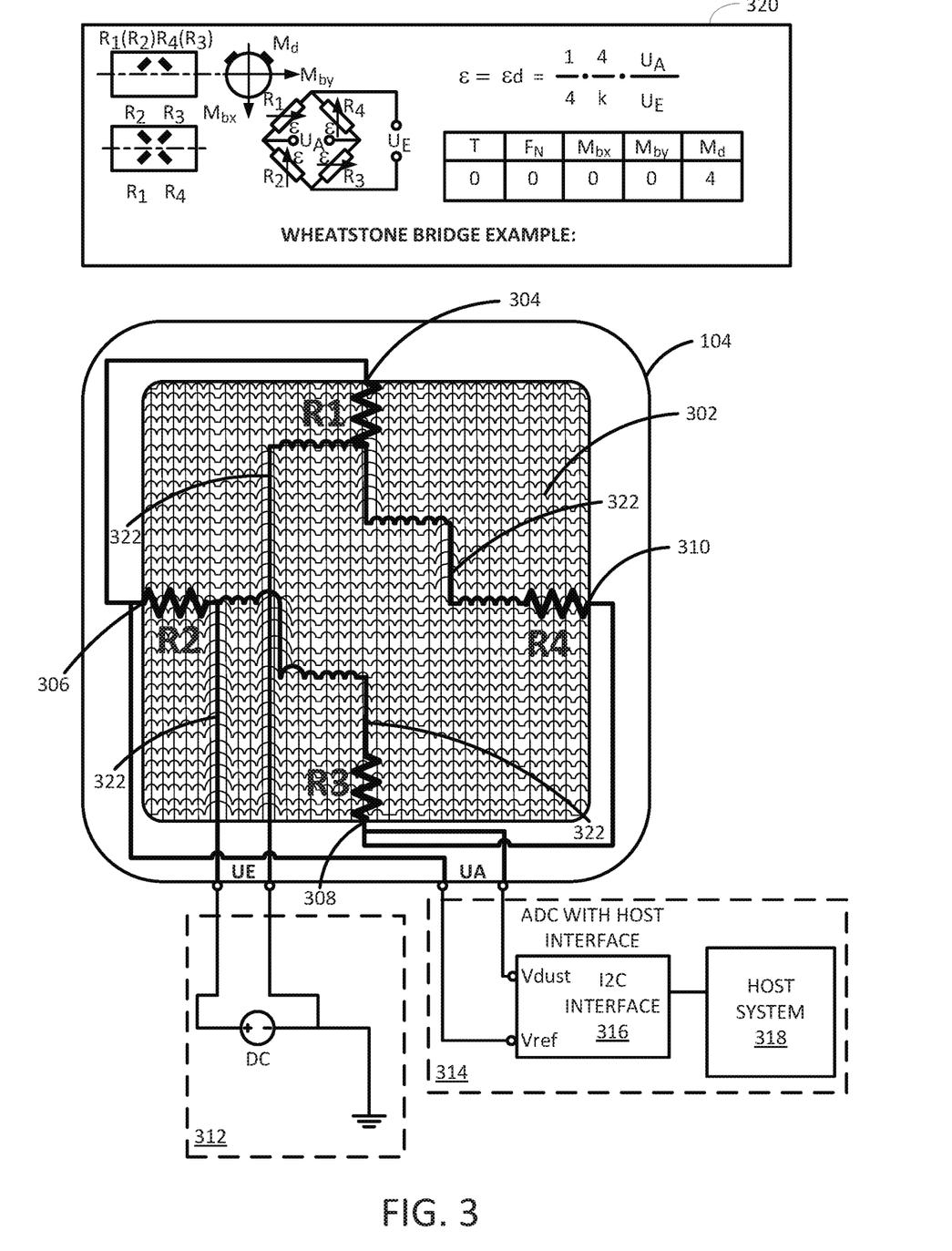
FIG. 3 is a block diagram of an example filter with an example strain gauge configuration of the present disclosure.

FIG. 3 illustrates one example configuration of the strain gauge 106 on a filter 104. The configuration illustrated in FIG. 3 illustrates a Wheatstone bridge configuration that can be used to measure small changes in resistance due to the small amount of airflow (e.g., approximately 15 to 50 CFM) generated by the fan 102, as opposed to the large amounts of airflow (e.g., greater than 700 CFM) created by HVAC systems.

In one example, the filter 104 may include a filter mesh 302. A plurality of strain gauges 304, 306, 308 and 310 may be applied to a center portion of each edge of the filter mesh 302. In one example, each strain gauge 304, 306, 308 and 310 may be represented as at least one representative resistor R1, R2, R3 and R4. Although FIG. 3 illustrates the lines 322 running in a particular orientation on, or in, the filter mesh 302, it should be noted that the lines 322 may be deployed in a serpentine fashion to cover at least 50% of the surface area of the filter mesh 302, as illustrated above in FIG. 2.

In one example, the filter 104 may include a known voltage source 312 and a voltage sensor 314. In one example, the known voltage source 312 may apply a known voltage (or a bridge excitation voltage, $U_E$) across the strain gauges 304, 306, 308 and 310. The voltage sensor 314 may measure a response voltage (or a bridge output voltage, $U_A$).

In one example, the voltage sensor 314 may include an analog-to-digital converter (ADC) with a host interface 316. The ADC with the host interface 316 may receive the reference voltage generated by the known voltage source 312 at an input $V_{ref}$ and the response voltage caused by dust and other contaminants on the strain gauges 304, 306, 308 and 310 at an input $V_{dust}$. The voltages may be used to calculate an effective strain and percentage clogging of the filter 104. The values from the calculation may be communicated to a host system 318 of the voltage sensor 314 via an I2C interface. The host system 318 may trigger an alarm when the percentage clogging of the filter 104 is greater than a threshold value.

Table 320 in FIG. 3 illustrates the assumptions for calculating an effective strain ($\epsilon$) or an effective strain in a given direction ($\epsilon_d$). In one example, the arrangement of the resistors R1, R2, R3, and R4 may be assumed to be on a cylindrical shape (e.g., a shape of the fibers in the filter mesh 302). In table 320, T represents temperature, $F_N$ represents a longitudinal or normal force, $M_{bx}$ represents a bending moment in an x direction, $M_{by}$ represents a bending moment in a y direction, and Md represents an amount of torque.

The letter k represents a gauge factor. The gauge factor is a characteristic of the strain gauge 106. The value of k is provided with the strain gauge 106. In one example, the value of k for a metal strain gauge (e.g., fabricated from copper) may be 2.

Figure 4:
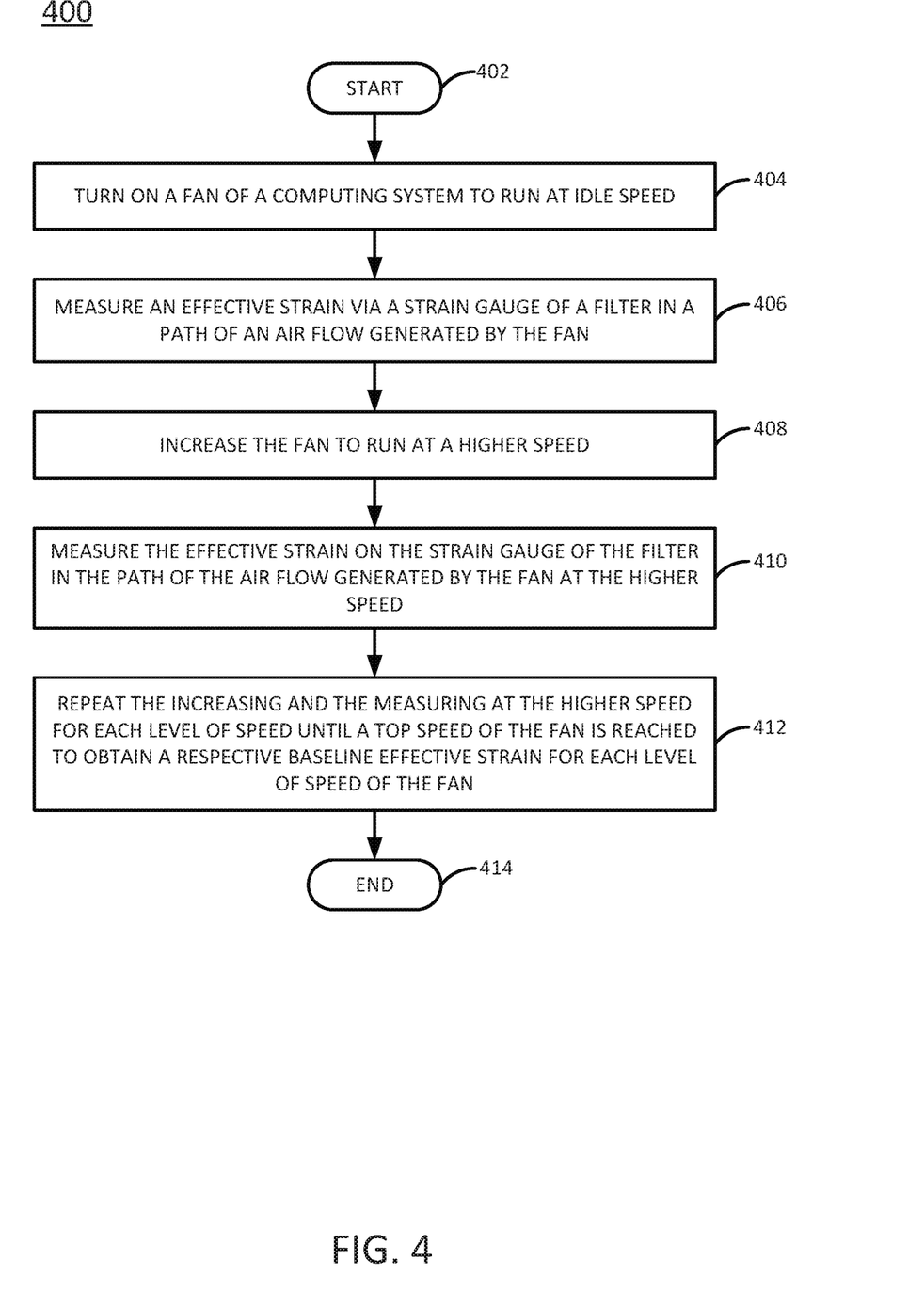
FIG. 4 is a flow diagram of an example method for calibrating a strain gauge.

FIG. 4 illustrates a flow diagram of an example method 400 for calibrating a strain gauge. In one example, the method 400 may be performed by the computing system 100 illustrated in FIG. 1.

At block 402, the method 400 begins. At block 404, the method 400 turns on a fan of a computing system to run at an idle speed. As noted above, unlike other systems that calibrate strain gauges under no load or no air flow, the present disclosure calibrates the strain gauges under the presence of an air flow. During normal operation of computing systems, the electronic components generate heat and are cooled by operation of a fan within the computing system. Thus, if the strain gauges were calibrated without air flow, each time the fan is turned on, the strain gauge may generate a false positive that the filter is clogged.

At block 406, the method 400 measures an effective strain via a strain gauge of a filter in a path of an air flow generated by the fan. The design of the strain gauge and the configuration of the strain gauges on the filter mesh of the filter of the present disclosure provide a strain gauge that has high sensitivity and granularity in measuring clogging levels of the filter. For example, the fan of the computing system 100 may generate an air flow of approximately 15-50 CFM that may be undetectable by strain gauge designs for HVAC systems that generate over 700 CFM of air flow.

Example designs of the strain gauge are described above and illustrated in FIGS. 2 and 3, As noted above, the effective strain measured by the strain gauges under air flow can be correlated to a percentage of clogging of the filter.

At block 408, the method 400 increases the fan to run at a higher speed. In one example, the fan of the computing system may have different levels of speed during operation.

At block 410, the method 400 measures the effective strain on the strain gauge of the filter in the path of the air flow generated by the fan at the higher speed. As noted above, the effective strain measured by the strain gauges under air flow can be correlated to a percentage of clogging of the filter.

At block 412, the method 400 repeats the increasing and the measuring at the higher speed for each level of speed until a top speed of the fan is reached to obtain a respective baseline effective strain for each level of speed of the fan. In one example, the fan may only have two levels of speed (e.g., an idle speed and a top speed). In other examples, the fan may have multiple levels of speed (e.g., an idle speed, a medium speed and a top speed and so on).

Regardless of the how many levels of speed are available for the fan, an effective strain may be measured for each speed level such that a baseline effective strain may be associated with each speed level. For example, if the fan has two speed levels, a baseline effective strain may be associated with the first speed level of the fan and a different baseline effective strain may be associated with a second speed level of the fan.

In one example, a threshold value may be associated with each baseline effective strain for each speed level. Thus, after the strain gauge is calibrated, depending on a level of speed of the fan during standard operation, the computing system may determine if the filter is clogged above an acceptable level of clogging.

In one example, the method 400 may be repeated each time a new environment is presented to the computing system. The new environment may include installing a new filter or a cleaned filter. When moving the computing system to a new location, changing a configuration of the electronic components within the computing system, and the like, a recommendation to clean or replace the filter may be provided so that a new baseline calibration can be done for the new environment. For example, the computing system can detect that the computing system was moved when an alternating current (AC) power cycle is detected (e.g., the computing system is powered down, an AC source is not present for a period of time, and then powered back up). In one example, the computing system may detect a change in configuration when new hardware is detected or slots within the computing system detect different hardware. Any event that may indicate that the environment or the computing system may have changed may prompt for the filter to be replaced or cleaned, and a recalibration should proceed. In an example, the amount of clogging may be stored automatically (e.g., periodically, continuously, etc.) or manually, and the computing system may recalibrate based on the stored amount of clogging when a change in configuration is detected. At block 414, the method 400 ends.

Figure 5:
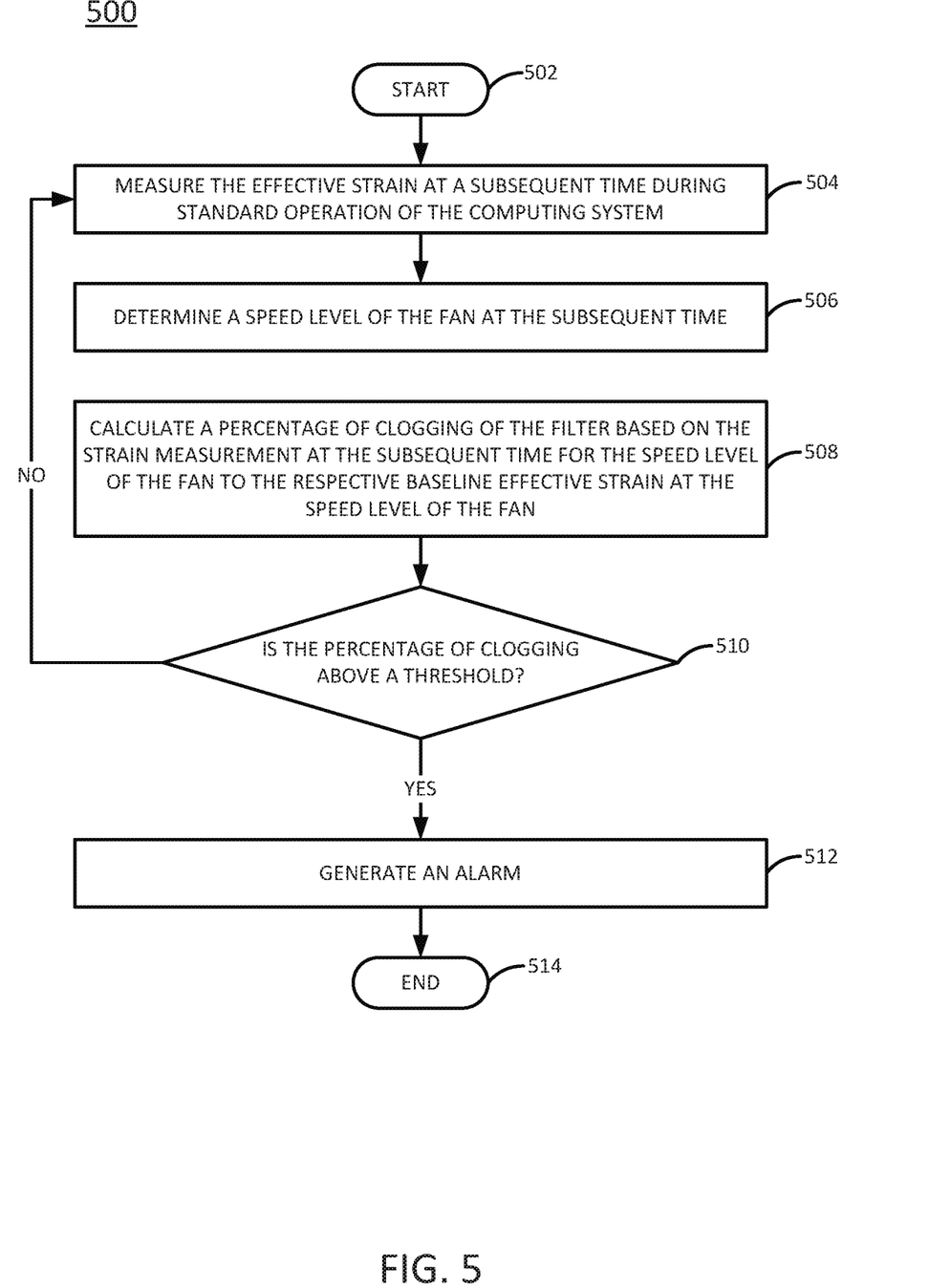
FIG. 5 is a block diagram of an example method for measuring an effective strain.

FIG. 5 illustrates a flow diagram of an example method 500 for measuring an effective strain. In one example, the blocks of the method 500 may be performed by the computing system 100 described above and illustrated in FIG. 1, In one implementation, the method 500 may be performed after the method 400 is performed to calibrate the strain gauges on the filter.

At block 502, the method 500 begins. At block 504, the method 500 measures the effective strain at a subsequent time during standard operation of the computing system. For example, after the strain gauge is calibrated, the computing system may periodically measure the effective strain across the strain gauge. For example, the computing system may measure the effective strain every "x" time period (e.g., every 30 seconds, every 10 minutes, every hour, and the like).

At block 506 the method 500 determines a speed level of the fan at the subsequent time. For example, the fan may operate at different levels of speed and each level of speed may be associated with a different baseline effective strain. The respective baseline effective strain for a particular level of speed of the fan may be associated with a threshold for clogging of the filter.

At block 508, the method 500 determines if the percentage of clogging is above the threshold. For example, the effective strain may be converted into a percentage of clogging of the filter. Examples of how the conversion may be performed are described above. In some implementations, the effective strain may be adjusted based on temperature measurements and/or humidity measurements to determine a percentage of clogging of the filter. In one example, the percentage of clogging of the filter may be supplied to the BIOS or operating system of a computing system for the user. In another example, applications may be deployed on the computing system to allow access to the percentage of clogging of the filter in real time or as historical data.

If the percentage of clogging is not above the threshold, then the method 500 may return to block 504. Then blocks 504-510 may be repeated periodically.

However, if the percentage of clogging is above the threshold, then the method 500 may proceed to block 512. At block 512, the method 500 may generate an alarm. For example, the computing system may generate a warning message that is displayed on a display of the computing system. In another example, an indicator light may be activated signaling that the filter is clogged past an acceptable level. In another example, an audible alarm may sound from a speaker on, or attached to, the computing system. The computing system may stop or pause operation until the filter is replaced and the alarm is cleared. At block 514, the method 500 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A computing system, comprising:
   at least one electronic component that generates heat;
   a fan to generate an air flow within the computing system to cool the at least one electronic component; and
   a filter located in a path of the air flow generated by the fan, wherein the filter comprises a filter mesh with a strain gauge that is encapsulated, wherein the strain gauge comprises a conductive wire that is intertwined with the filter mesh to measure an amount that the filter mesh is clogged.

2. The computing system of claim 1, wherein the filter is located downstream of the fan.

3. The computing system of claim 1, wherein the filter is located upstream of the fan.

4. The computing system of claim 1, wherein the strain gauge is encapsulated and incorporated into the filter mesh by being integrally formed inside of the filter mesh.

5. The computing system of claim 1, wherein the strain gauge incorporated into the filter mesh by being printed onto the filter mesh.

6. The computing system of claim 5, wherein the strain gauge is encapsulated with a non-conductive coating.

7. The computing system of claim 1, wherein the strain gauge is weaved through or stitched into the filter mesh.

8. A filter, comprising: a filter mesh; a plurality of strain gauges comprising a conductive wire that is intertwined and encapsulated within the filter mesh as part of the filter mesh, wherein each one of the plurality of strain gauges measures an amount of deflection from an air flow generated by a fan in a computing system; a known voltage source coupled to a first pair of the plurality of strain gauges; and a voltage sensor coupled to a second pair of the plurality of strain gauges to measure an output voltage generated by the second pair of the plurality of strain gauges as a resistance value of the first pair of the plurality of strain gauges changes.

9. The filter of claim 8, wherein the plurality of strain gauges is encapsulated with a non-conductive coating.

10. The filter of claim 8, wherein the plurality of strain gauges is weaved through or stitched into the filter mesh.

11. A method, comprising:
    providing a filter in a computing system comprising a filter mesh with a strain gauge, wherein the strain gauge is encapsulated, wherein the strain gauge comprises a conductive wire that is intertwined with the filter mesh;
    turning on a fan of the computing system to run at an idle speed;
    measuring an effective strain via the strain gauge of the filter in a path of an air flow generated by the fan;
    increasing the fan to run at a higher speed;
    measuring the effective strain on the strain gauge of the filter in the path of the air flow generated by the fan at the higher speed; and
    repeating the increasing and the measuring at the higher speed for each level of speed until a top speed of the fan is reached to obtain a respective baseline effective strain for each level of speed of the fan.

12. The method of claim 11, comprising:
    measuring the effective strain at a subsequent time during standard operation of the computing system;
    determining a speed level of the fan at the subsequent time;
    calculating a percentage of clogging of the filter based on the strain measurement at the subsequent time for the speed level of the fan to the respective baseline effective strain at the speed level of the fan; and
    generating an alarm when the percentage of clogging is above a threshold.

13. The method of claim 11, comprising:
    detecting a new filter has been installed, a cleaned filter has been installed or a new configuration of the computing system; and
    calculating the respective baseline strain measurement for each level of speed of the fan with the new filter, the cleaned filter or in the new configuration.

* * * * *